April 3, 1945.  E. G. FASSEL  2,372,890

FILTER CONTROLLED PHOTOGRAPHIC RECORDING EQUIPMENT

Filed Jan. 24, 1942

INVENTOR
ELGIN G. FASSEL
BY
Wheeler, Wheeler & Wheeler
ATTORNEYS.

UNITED STATES PATENT OFFICE 2,372,890

FILTER CONTROLLED PHOTOGRAPHIC RECORDING EQUIPMENT

Elgin G. Fassel, Milwaukee, Wis.

Application January 24, 1942, Serial No. 428,024

6 Claims. (Cl. 88—24)

My invention relates to improvements in photographic recording equipment, with particular reference to the photographic reproduction of both sides of moving documents panoramically during a single passage of the documents through a photographic field, in which both sides of the same portions of each document are simultaneously exposed.

The object of this invention is to provide filtering means for blocking transmitted light, so as to photograph by reflected light only.

More particularly stated, it is my object to provide means whereby the respective sides of the document may be illuminated by light having a different color characteristic from that employed to illuminate the other side of the document, and to employ filtering means for excluding or blocking from the reflected beam on each side of the document all rays which penetrate the document from the other side, and which have a different color characteristic as above stated.

In the drawing.

Like parts are identified by the same reference characters throughout both views.

Figure 1:
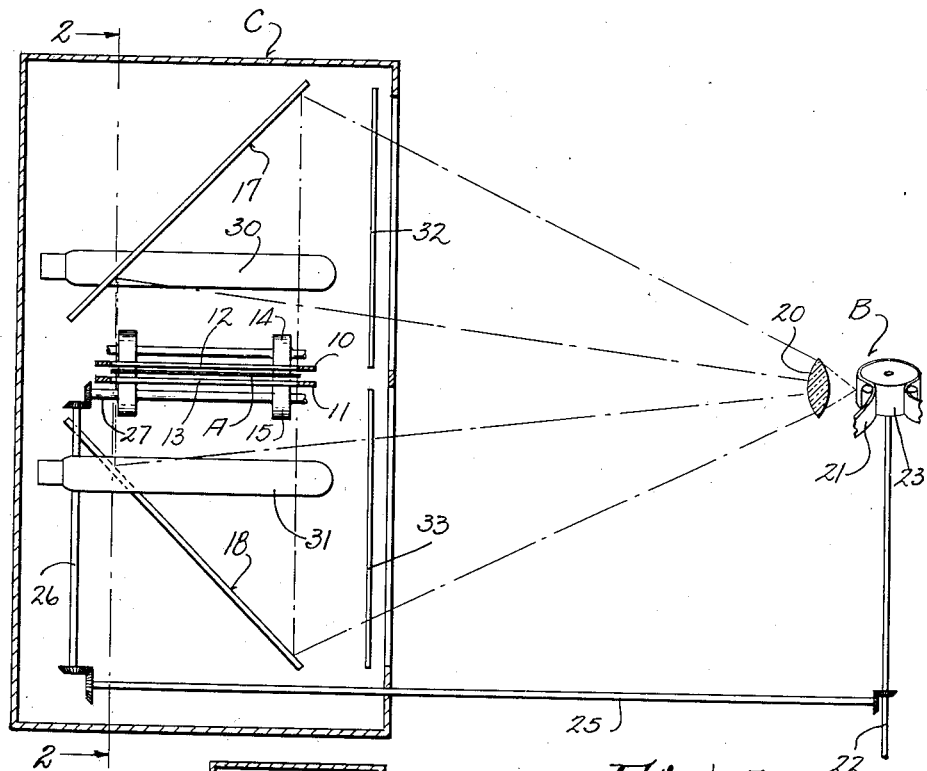
Figure 1 is a conventional illustration, in perspective, showing portions of photographic recording equipment embodying my invention, in a form preferably used in the practice of my improved method.
Figure 2:
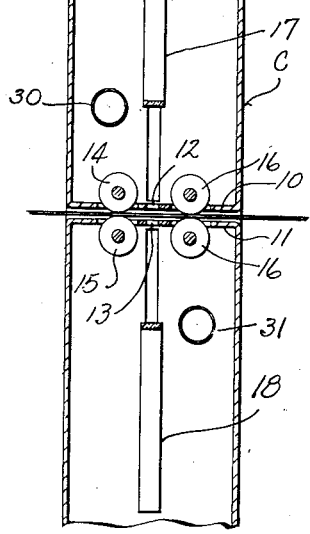
Figure 2 is a sectional view drawn to line 2—2 of Figure 1.

In the practice of my improved method, I pass the document through the photographic field of a camera, and I illuminate opposite faces of the document artificially, using lights having different color characteristics. I direct beams of light reflected from the respective faces of the document convergently to the object glass of a camera having a movable sensitized film which I cause to travel in synchronism with the moving document, but in an opposite direction. I filter out of each reflected beam all rays of light having the color characteristic of the other beam, whereby rays of light penetrating the document are prevented from reaching the sensitized film.

Due to the angle of convergence of the respective beams, the images imposed by them upon the film are made to appear on opposite sides of its longitudinal center line, whereby paired photographs are produced upon the film in transversely offset relation to each other. I preferably produce such photographs panoramically by excluding rays of light from all portions of the moving document except a narrow exposure zone extending transversely across the line of movement of the document, whereby the images of successive portions of the document may be successively imprinted upon the film in a continuous operation, which may include either a single document or any desired number of documents in a series which are being photographed as a group.

The drawing illustrates a form of apparatus which I have invented for carrying out the above described method.

The documents A are fed through the photographic field of a camera B, and are supported within a viewing chamber C by opaque guide walls 10 and 11 provided with exposure slots 12 and 13, which extend transversely of the line of document movement and which register with each other so that both faces of any given portion of the document may be simultaneously exposed.

The documents are delivered through the guideway by means of upper and lower feed rollers 14 and 15. The guideway walls are provided with openings to receive these rollers, whereby the document may be engaged between them. On the outfeeding side, the document may pass between the idle rollers 16.

Obliquely placed narrow mirrors 17 and 18 are disposed in a plane which includes the exposure slots 12 and 13. In said plane the mirrors diverge from an apex at the rear of the viewing chamber C and are placed at such an angle as to direct beams of reflected light from the faces of the document exposed in the respective slots to the object glass 20 of the camera, by means of which the images of the opposite faces of a document are focused upon opposite sides of the longitudinal center line of a sensitized film 21. The film may be actuated from any suitable source of power by means of a shaft 22, which supports the drum 23, over which the film 21 is passed. The shaft 22 is connected with the feed rollers 15 by the intergeared shaft 25, 26 and 27.

The parts of the equipment thus far described may be assumed to be of any ordinary construction for panoramically photographing the obverse and reverse sides of opposite faces of a moving document upon a correspondingly moving sensitized film. But to avoid confusion of images, due to light penetration of the exposed portion of the document in the feedway, I utilize the housing or cabinet C to exclude external light and illuminate the exposed portion of the document by lamps 30 and 31, elongated bulbs parallel to the slots 12 and 13 being preferably employed. The rays of light from the respective lamps have different color characteristics, either due to the use of differently colored bulbs or to the use of differently colored gases within the bulbs, or to the use of fluorescent lamps having coatings which fluoresce in different colors. In any event, the colors from the respective illuminating sources are preferably opposite, or complementary. At least, they are distinctly different to the extent of being separable by filtration.

Therefore, by interposing color filters 32 and 33 in the beams reflected to the camera by the mirrors 17 and 18, I am able to block or filter out from each beam the rays of light originating from the lamp on the opposite side of the feedway.

For example, assuming that the rays of light emanating from the lamp 30 are red, I employ a filter plate 32 capable of transmitting red rays only, and by using on the other side of the feedway a lamp emanating green rays I am able to block or filter out all red rays penetrating the document from the lamp 30 by means of a filter plate 33 which will transmit only the green rays. Clear photographs of the respective faces of the documents are therefore produced upon the sensitized film on opposite sides of the longitudinal center line of the film and occupying the same length or section of film. I use a panchromatic film or one capable of registering the images reaching it in the respective colors which pass the filters.

The mirrors themselves may constitute, or supplement, the filters. For example, one mirror may be red and the other green, and in some cases the use of separate filters may be dispensed with. Any means operative between the document and the film for blocking rays of light which penetrate the document will be within the scope of my invention.

I claim:

1. In photographic recording equipment for producing spaced-apart images of opposite sides of objects, including a camera, a transversely slotted feedway in the photographic field of the camera and associated mirrors for projecting to the camera convergent beams of light reflected from opposite faces of documents in the feedway exposed in said slots, the combination therewith, of lamps on opposite sides of the feedway, adapted to illuminate the entire exposed areas with light of substantially equal intensity—the lamps on each side being adapted to emit rays of different color characteristics from those on the other side, and light filtering means adapted to pass rays reflected by said document and to block from said beams rays of light transmitted through the document.

2. In panoramic photographic recording equipment for obtaining paired photographs of different data appearing on opposite sides of a translucent document, the combination of a viewing chamber intermediately crossed by opaque walls constituting a feedway for the documents to be photographed, said feedway having registering slots in opposing walls through which successive portions of the document may be progressively exposed, means for mechanically advancing documents through said feedway at a predetermined rate of advancement, obliquely placed mirrors on opposite sides of the feedway in a plane common to the feedway slots and in positions to reflect rays of light from non-complementary portions of a document exposed in said feedway through the respective viewing chamber slots along convergent lines to a light sensitive surface to form separate spaced-apart images of each side of said documents on said light sensitive surface, means for illuminating each of said non-complementary portions of the exposed portions of the document with a different colored light, and filter means interposed between said mirrors and said light sensitive surface for illuminating transmitted light from the respective reflected rays of light passing to said sensitized surface.

3. In photographic recording equipment, the combination with a camera of means for supporting objects to be photographed in a plane bisecting the object glass of the camera, means for simultaneously illuminating opposite faces of such objects with light of different color characteristics, means for reflecting beams of light from the non-complementary respectve faces of such objects along convergent lines to the object glass of the camera to form separate spaced-apart images of each side of said object upon the light sensitive surface in said camera, and filtering screens for eliminating from such beams all rays transmitted through and having the color characteristic of the light on the opposite face of the object.

4. In photographic recording equipment a feedway including means for advancing documents therethrough, said feedway having opaque walls with narrow slots extending transversely of said feedway, said slots being in registry with each other and adapted to simultaneously expose successive portions of both faces of the document while the same is traversing said feedway, oppositely inclined oblique mirrors positioned on opposite sides of the feedway in registry with the respective slots and each adapted to reflect rays of light from said slots to a common point of area, a camera having an objective lens positioned to receive reflected rays from said mirrors and to optically project said rays to a film moving in definite time relation to the movement of said documents through said feedway, means for illuminating each face of the document with light rays of a different color from those illuminating the opposite side and a filter plate in the path of each reflected beam adapted to block rays of light having the color of the other beam.

5. Equipment for simultaneously producing photographs of different data on the respective sides of a document in side-by-side relation to each other on the same photo-sensitized surface, comprising the combination of means for projecting to a single camera spaced reflected images of said different data, means for illuminating said different data in complementary colors and with light of substantially the same intensity, and a set of filters, each in the path of the rays reflected from one side of the document, each filter being adapted to delete rays of light transmitted through the document from the other side.

6. In equipment for simultaneously producing on a sensitized strip spaced-apart images of different data appearing on opposite sides of a moving document, the combination of a camera provided with means for correspondingly moving said sensitized strip at a focal distance from the lens of the camera, a transversely slotted document feedway in the photographic field of the camera, associated mirrors for projection to the camera of convergent beams of light reflected from different data appearing on opposite sides of the document and exposed in said slots, means for illuminating each exposed side of the document with light of a different color from that on the other side so that reflected beams from said document may pass to said camera, and light filtering means in the paths of the reflected beams, each adapted to eliminate from its beam rays of light having the color of the other beam.

ELGIN G. FASSEL.